United States Patent [19]

Manico et al.

[11] Patent Number: 5,568,219
[45] Date of Patent: Oct. 22, 1996

[54] FILM CARTRIDGE WITH VISUAL INDICATOR FOR VERIFYING FILM LOADING IN CAMERA

[75] Inventors: Joseph A. Manico, Rochester; Dwight J. Petruchik, Honeoye Falls, both of N.Y.

[73] Assignee: Eastman Kodak Company, Rochester, N.Y.

[21] Appl. No.: 584,480

[22] Filed: Jan. 11, 1996

[51] Int. Cl.⁶ .......................... G03B 17/30; G11B 23/28
[52] U.S. Cl. .......................... 396/281; 242/348; 396/512; 396/515
[58] Field of Search .......................... 354/275, 289.1; 242/348, 348.4

[56] References Cited

U.S. PATENT DOCUMENTS

| | | | |
|---|---|---|---|
| 1,836,699 | 12/1931 | Wood | 354/275 |
| 3,490,350 | 1/1970 | Hardies et al. | 354/275 |
| 4,335,948 | 6/1982 | Cocco | 354/275 |
| 4,488,796 | 12/1984 | Edwards | 354/275 |
| 4,875,638 | 10/1989 | Harvey | 242/71.1 |
| 4,887,110 | 12/1989 | Harvey | 354/275 |
| 4,894,673 | 1/1990 | Beach | 354/275 |
| 5,032,861 | 7/1991 | Pagano | 354/275 |
| 5,255,039 | 10/1993 | Miller | 354/275 |
| 5,264,886 | 11/1993 | Byrd | 354/275 |
| 5,278,600 | 1/1994 | Takahashi et al. | 354/275 |
| 5,285,227 | 2/1994 | Lawther et al. | 354/275 |

*Primary Examiner*—Michael L. Gellner
*Assistant Examiner*—John Chizmar
*Attorney, Agent, or Firm*—Roger A. Fields

[57] ABSTRACT

A film cartridge comprising a housing with a film exit slit, and a film roll support rotatable inside the housing to unwind a filmstrip beginning with a film leader having several frame lengths from the film roll support to permit the film leader to be moved outwardly through the slit to accomplish film loading in a camera, is characterized by verifier means for providing a visible indication only when the film leader is moved substantially completely through the slit, whereby the visual indication will verify that enough of the filmstrip has been unwound from the film roll support to accomplish film loading in a camera.

8 Claims, 5 Drawing Sheets

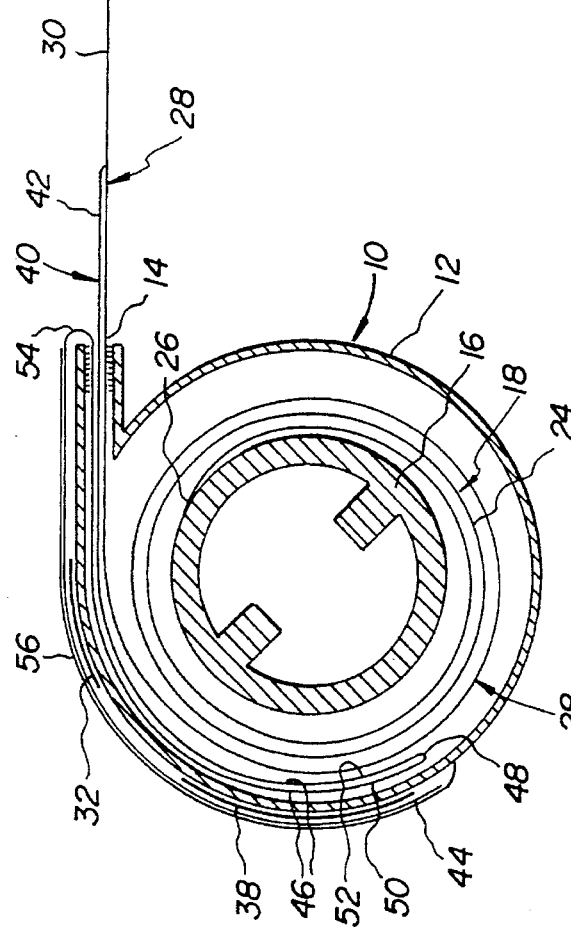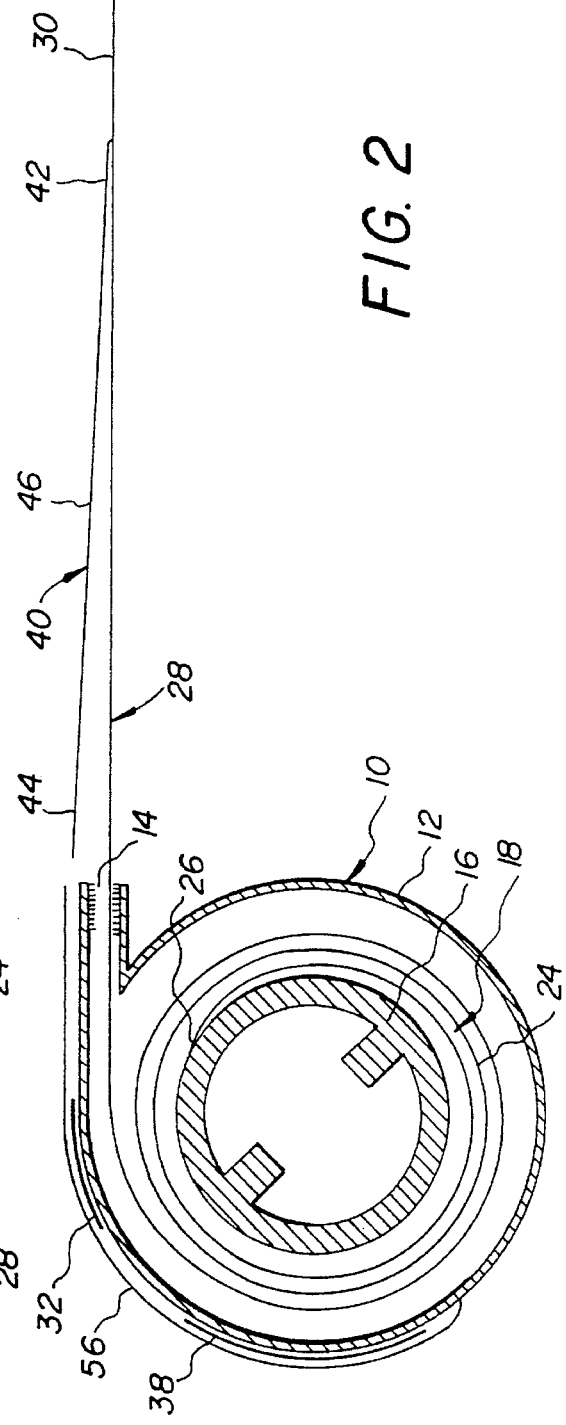

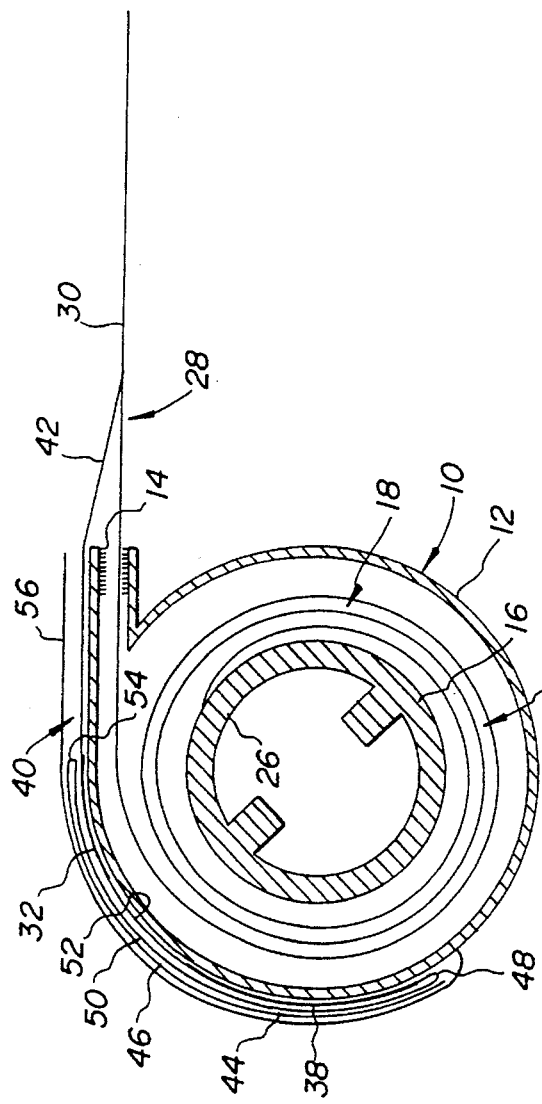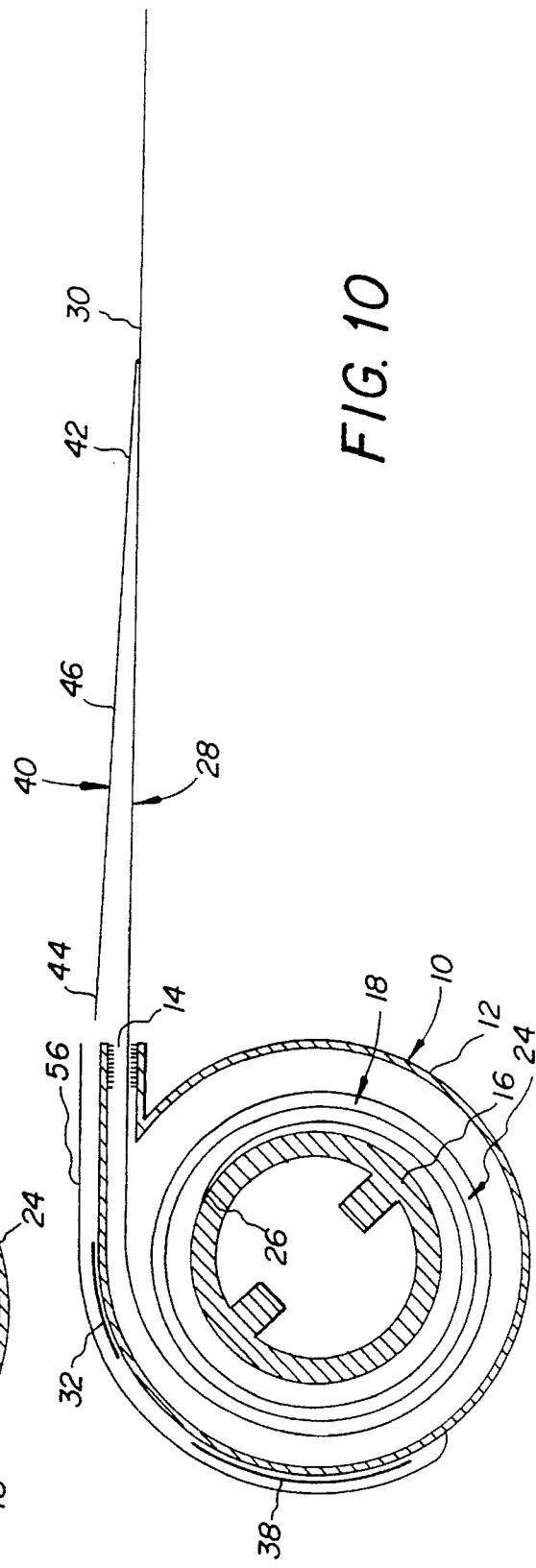

FILM CARTRIDGE WITH VISUAL INDICATOR FOR VERIFYING FILM LOADING IN CAMERA

CROSS-REFERENCE TO RELATED APPLICATIONS

Reference is made to commonly assigned applications Ser. No. 08/584,853, entitled FILM CARTRIDGE WITH VISUAL INDICATOR FOR VERIFYING FILM LOADING IN CAMERA and filed Jan. 11, 1996 in the name of Joseph A. Manico and Madhav Mehra, and Ser. No. 08/449,032, entitled FILM SPOOL WITH BUILT-IN AUDIBLE INDICATOR FOR VERIFYING FILM LOADING IN CAMERA and filed May 24, 1995 in the name of Joseph A. Manico.

FIELD OF THE INVENTION

The invention relates generally to the field of photography, and in particular to a film cartridge with a visual indicator for verifying film loading in a camera for example.

BACKGROUND OF THE INVENTION

To load most 35 mm cameras, a film cartridge is inserted in a loading chamber of the camera and the forward end portion of a film leader protruding from a light-trapping slit in the cartridge is placed over a take-up spool in the camera. In some cameras, the forward end portion of the film leader is manually attached to the take-up spool before a rear door of the camera is closed. Then, a film loading or winding operation is performed, for example, by manually pivoting a winding lever for the take-up spool and manually depressing a shutter release button several times. This is done until the entire leader is unwound from a supply spool inside the cartridge and is wound onto the take-up spool, and the first-available film frame is positioned for exposure. In other cameras, the forward end portion of the film leader is automatically secured to the take-up spool at the beginning of the film loading operation. As the take-up spool is rotated via a motor drive, for example, one or more circumferential teeth of the spool engage the forward end portion of the film leader at its perforations to wind the leader onto the spool and position the first-available film frame for exposure. A spring-like deflector or other suitable means may be provided on the rear door of the camera for pressing the film leader against the take-up spool to facilitate engagement of the forward end portion of the leader by the circumferential teeth of the spool.

A problem that exists in some 35 mm cameras is that even though the photographer believes the forward end portion of the film leader is secured to the take-up spool, the forward end portion may fail to be engaged with the spool or may become disengaged from the spool during the film loading operation. As a result, the film leader will not be wound onto the take-up spool and the first-available film frame cannot be positioned for exposure. However, since the rear door of the camera is closed, the photographer may not be aware of the malfunction.

SUMMARY OF THE INVENTION

A film cartridge comprising a housing with a film exit slit, and a film roll support rotatable inside the housing to unwind a filmstrip beginning with a film leader having several frame lengths from the film roll support to permit the film leader to be moved outwardly through the slit to accomplish film loading in a camera, is characterized by:

verifier means for providing a visible indication only when the film leader is moved substantially completely through the slit, whereby the visual indication will verify that enough of the filmstrip has been unwound from the film roll support to accomplish film loading in a camera.

BRIEF DESCRIPTION OF THE DRAWINGS

FIG. 1 is a partial section view of a film cartridge with a visual indicator for verifying film loading in a camera according to a preferred embodiment of the invention, showing the cartridge with a film leader partially protruding from the cartridge before film loading;

FIG. 2 is a partial section view similar to FIG. 1, showing the cartridge with the film leader withdrawn from the cartridge for film loading;

FIG. 9 is a partial section view of a film cartridge with a visual indicator for verifying film loading in a camera according to an alternate embodiment of the invention, showing the cartridge with a film leader partially protruding from the cartridge before film loading; and FIG. 10 is a partial section view similar to FIG. 9, showing the cartridge with the film leader withdrawn from the cartridge for film loading;

DETAILED DESCRIPTION OF THE INVENTION

Figure 3:
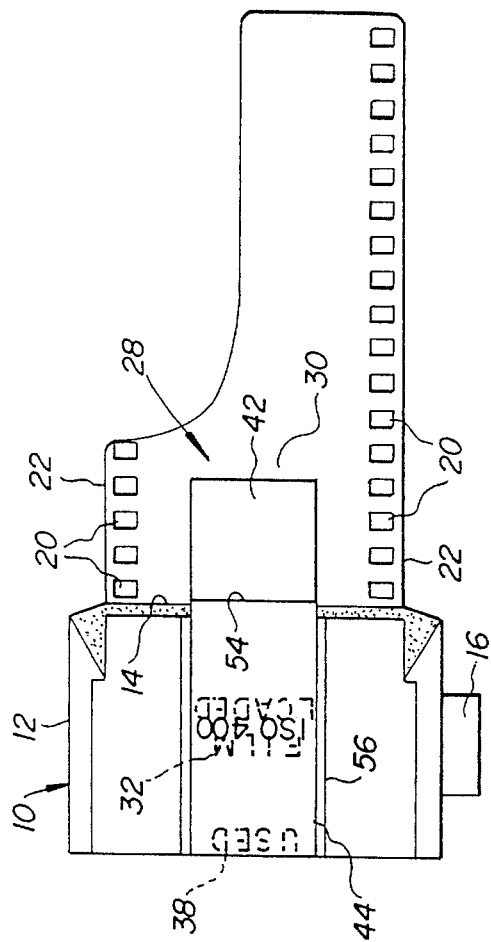
FIG. 3 is a plan view of the cartridge as seen in FIG. 1.

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Preferred Embodiment

Referring now to the drawings, FIGS. 1–6 show a film cartridge 10 comprising a housing 12 with a plush-lined light-trapping film exit slit 14 and a flanged film spool 16 rotatably supported inside the housing. A known 35 mm filmstrip 18 having two identical series of edge perforations 20 inwardly adjacent respective longitudinal film edges 22 is loosely coiled in a film roll 24 about the film spool 16 between a pair of radial flanges, not shown, on the film spool. An inner end portion 26 of the filmstrip 18 is attached to the film spool 16. The first several frame lengths, i.e. 3–4 frame lengths, of the filmstrip 18 constitute a film leader 28. The film leader 28 forms an outermost convolution of the film roll 26 and has a partly reduced-width forward end portion 30 that initially protrudes from the film exit slit 14. See FIGS. 1, 3 and 5.

A "FILM LOADED" 32 indicator is imprinted on the exterior of the housing 12 at a location that permits the indicator to be seen through a rear window 34 of a camera 36 when the cartridge 10 is in the camera. See FIGS. 2, 4, 6 and 8. A "FILM USED" indicator 38 is imprinted on the exterior of the housing 12 at a location that prevents the indicator from being seen through the rear window 34.

Figure 4:
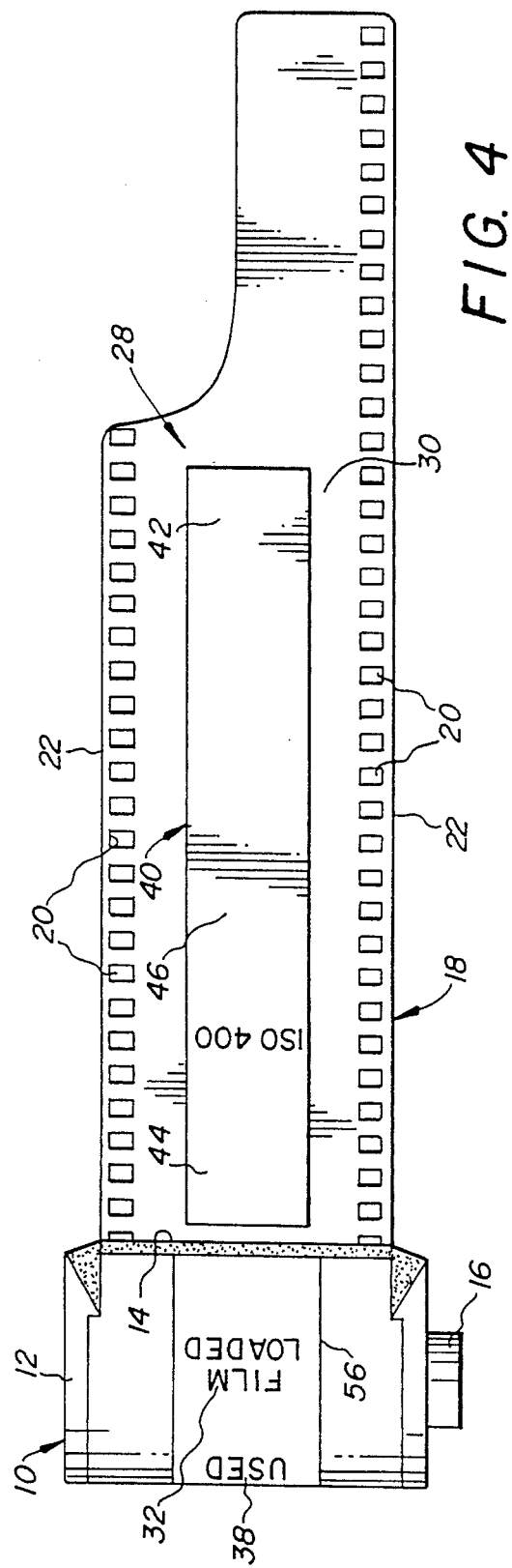
FIG. 4 is a is a plan view of the cartridge as seen in FIG. 2.
Figure 5:
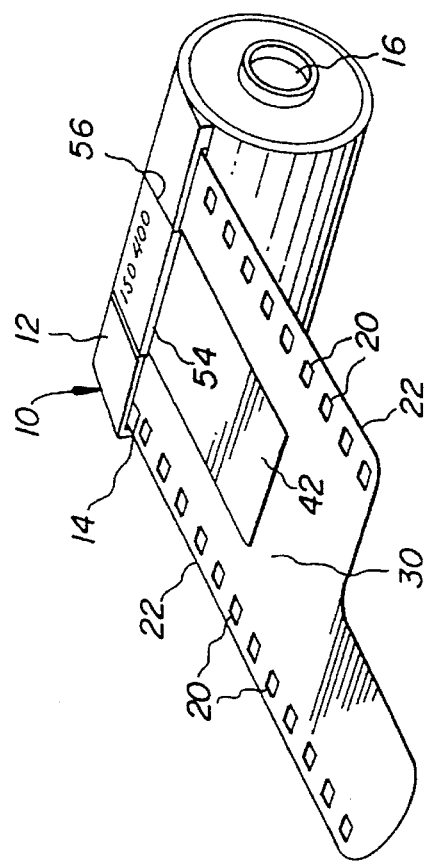
FIG. 5 is a perspective view of the cartridge as seen in FIG. 1.
Figure 6:
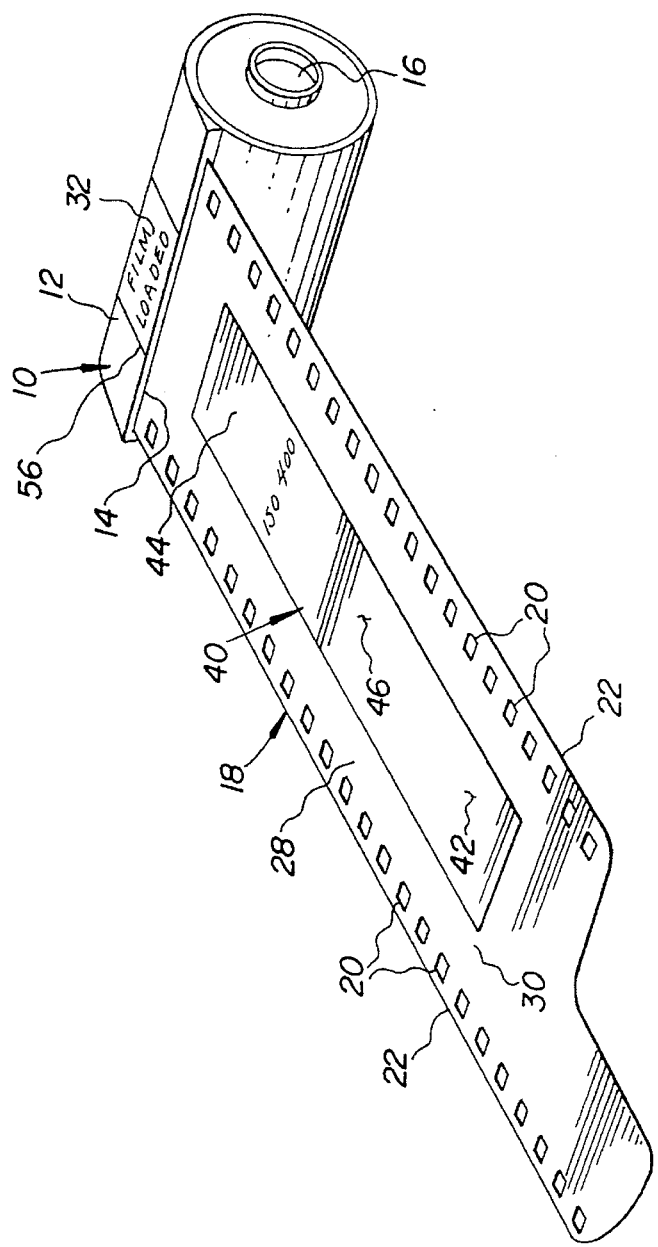
FIG. 6 is a perspective view of the cartridge as seen in FIG. 2.

A flexible opaque cover strip 40 consists of a leading end portion 42, a trailing end portion 44 and an intermediate fan-folded portion 46. The cover strip 40 is sufficiently narrower than the filmstrip 18 to be able to rest on the filmstrip between the two series of edge perforations 20 as shown in FIGS. 4 and 6. The leading end portion 42 is permanently hingedly secured to the protruding forward end portion 30 of the film leader 28 as shown in FIGS. 1 and 2. The trailing end portion 44 covers the "FILM LOADED" indicator 32 and the "FILM USED" indicator 38 as shown in FIGS. 1 and 3. The intermediate fan-folded portion 46 is located inside the housing 12 and has an internal fold-line 48 that divides that portion into two superimposed sections 50 and 52. As shown in FIG. 1, the section 52 substantially rests on the film leader 28, that is, on the outermost convolution of the film roll 26, and the section 50 rests on the section 52. The section 50 and the trailing end portion 44 are connected at an external fold-line 54 outside the film exit slit 14. See FIG. 1.

A transparent open pocket 56 is secured to the exterior of the housing 12 to hold the trailing end portion 44 of the cover strip 40 in place over the "FILM LOADED" indicator 32 and the "FILM USED" indicator 38.

Operation

Figure 7:
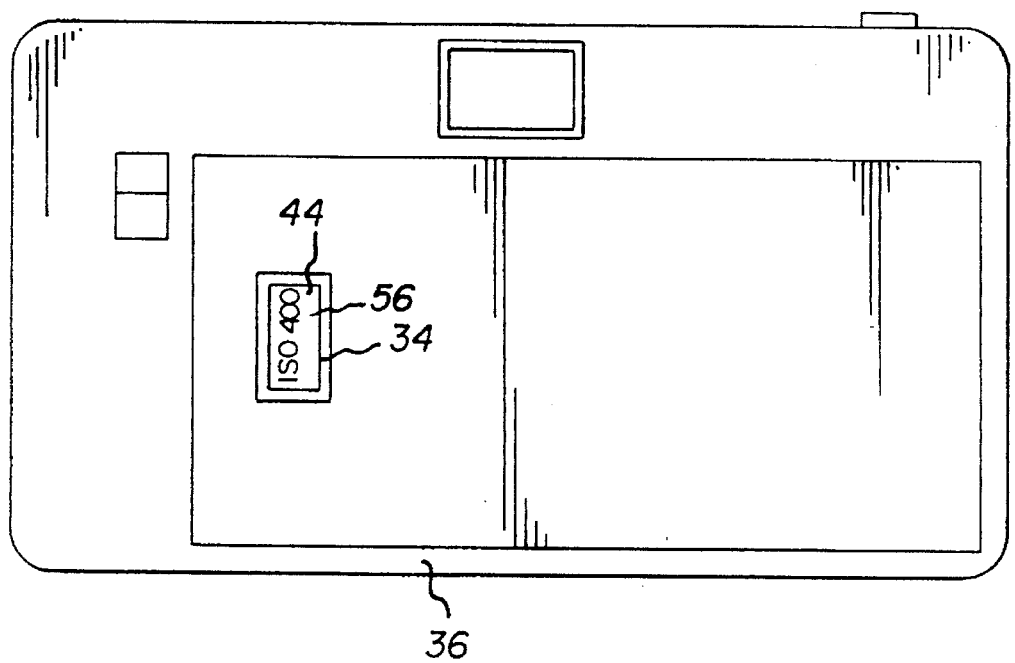
FIG. 7 is a rear elevation view of camera containing the cartridge as seen in FIG. 1.
Figure 8:
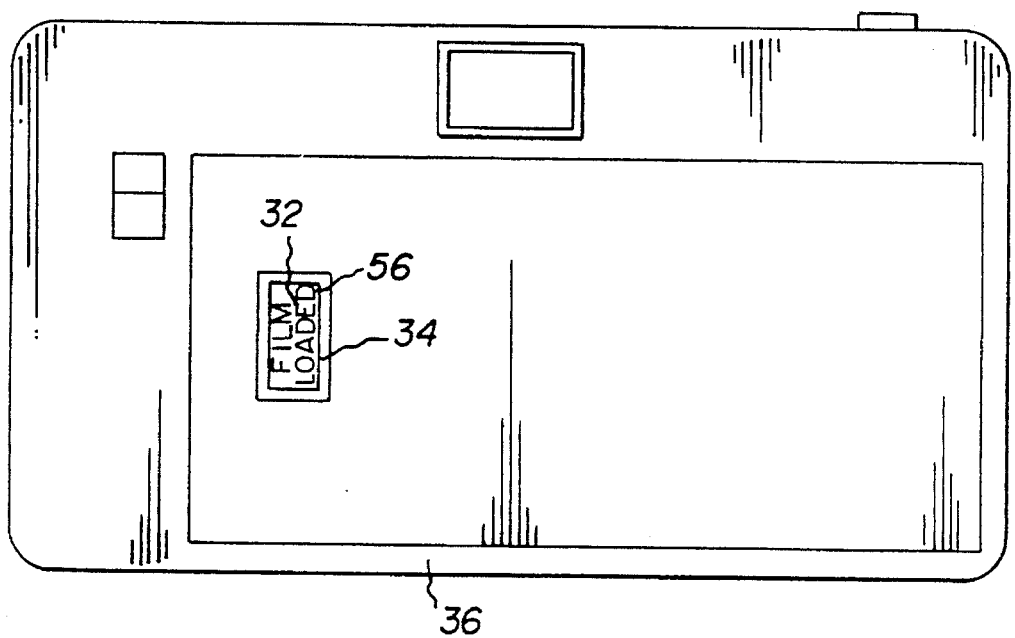
FIG. 8 is a rear elevation view of camera containing the cartridge as seen in FIG. 2.

When the cartridge 10 is inserted in the camera 36, the "FILM LOADED" indicator 32 cannot be seen in the rear window 34 because the trailing end portion 44 of the cover strip 40 is covering the indicator. See FIG. 7.

The protruding forward end portion 30 of the film leader 28 is attached to a take-up spool, not shown, in the camera 36 and the spool is windingly rotated to wind the protruding forward end portion onto the take-up spool and to unwind the remainder of the film leader 28, i.e. the outermost convolution of the film roll 26, off the film spool 16 and onto the take-up spool. As the film leader 28 is moved from the cartridge 10 and onto the take-up spool, the leading end portion 42 of the cover strip 40 is moved together with the forward end portion 30 of the film leader. Consequently, the section 52 of the intermediate fan-folded portion 46 of the cover strip 40 is pulled from beneath the section 50 of the intermediate fan-folded portion, which causes the intermediate fan-folded portion to unfold at its internal fold-line 48 between the two sections. Once the intermediate fan-folded portion 46 is pulled with the film leader 28 through the film exit slit 14, the cover strip 40 is unfolded at its external fold-line 54. Then, the trailing end portion 44 of the cover strip 40 is pulled out of the pocket 56 to successively uncover the "FILM USED" indicator 38 and the "FILM LOADED indicator 32. See FIGS. 1–8. Thus, as shown in FIGS. 2, 4 and 6, the "FILM LOADED" indicator 32 is not uncovered until the film leader 28 is removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

Alternate Embodiment

FIGS. 9 and 10 show an alternate embodiment of the cartridge 10. The same reference numbers as used in FIGS. 1–6 are used in FIGS. 9 and 10, to indicate the various components.

The only difference between the cartridge 10 in FIGS. 1–6 and the cartridge 10 in FIGS. 9 and 10 is that in FIGS. 9 and 10 the intermediate fan-folded portion 46 of the cover strip 40 is located in the pocket 56, folded underneath the trailing end portion 44 of the cover strip (rather than in the housing 12).

The operation of the cartridge 10 in FIGS. 9 and 10 is substantially similar to the operation of the cartridge 10 in FIGS. 1–6. The protruding forward end portion 30 of the film leader 28 is attached to a take-up spool, not shown, in the camera 36 and the spool is windingly rotated to wind the protruding forward end portion onto the take-up spool. As the film leader 28 is moved from the cartridge 10 and onto the take-up spool, the leading end portion 42 of the cover strip 40 is moved together with the forward end portion 30 of the film leader. Consequently, the section 52 of the intermediate fan-folded portion 46 of the cover strip 40 is pulled from beneath the section 50 of the intermediate fan-folded portion, which causes the intermediate fan-folded portion to unfold at the fold-line 48 between the two sections. Once the intermediate fan-folded portion 46 is pulled out of the pocket 56, the cover strip 40 is unfolded at its fold-line 54. Then, the trailing end portion 44 of the cover strip 40 is pulled out of the pocket 56 to uncover the "FILM USED" indicator 38 and the "FILM LOADED indicator 32. See FIGS. 9 and 10. Thus, the "FILM LOADED" indicator 32 is not uncovered until the film leader 28 is removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

The invention has been described with reference to a preferred embodiment. However, it will be appreciated that variations and modifications can be effected by a person of ordinary skill in the art without departing from the scope of the invention.

PARTS LIST 10. film cartridge
12. housing
14. slit
16. film spool
18. filmstrip
20. film perforations
22. longitudinal film edges
24. film roll
26. film inner end portion
28. film leader
30. protruding forward end portion
32. "FILM LOADED" indicator
34. rear window
36. camera
38. "FILM USED" indicator
40. cover strip
42. leading end portion
44. trailing end portion
46. intermediate fan-folded portion
48. fold-line
50. strip section 52. strip section
54. fold-line
56. pocket

We claim:

1. A film cartridge comprising a housing with a film exit slit, and a film roll support rotatable inside said housing to unwind a filmstrip beginning with a film leader having several frame lengths from said film roll support to permit said film leader to be moved outwardly through said slit to accomplish film loading in a camera, is characterized by:

a visible film-loaded indicator located to be seen through a window in a camera; and a flexible cover strip having a leading and portion secured to a forward end portion of said film leader, an opaque trailing end portion covering said film-loaded indicator, and an intermediate fan-folded portion extending between said leading and trailing end portions to be pulled via said leading end portion to unfold as said film leader is moved outwardly through said slit and being of suitable length to draw said trailing end portion off the film-loaded indicator to uncover the indicator only when said film leader is moved substantially completely through said slit.

2. A film cartridge as recited in claim 1, wherein said film-loaded indicator is located on the exterior of said housing, a transparent open pocket is secured to the exterior of said housing to hold said opaque trailing end portion of the cover strip over said film-loaded indicator and to permit the indicator to be seen when the trailing end portion is drawn off the indicator.

3. A film cartridge as recited in claim 1, wherein said intermediate fan-folded portion of the cover strip is located inside said housing to be moved outwardly through said slit together with said film leader.

4. A film cartridge as recited in claim 3, wherein said trailing end portion and said intermediate fan-folded portion of the cover strip are connected at an external fold-line outside said slit.

5. A film cartridge as recited in claim 4, wherein said intermediate fan-folded portion of the cover strip has an internal fold-line inside said housing which divides the intermediate fan-folded portion into two superimposed sections.

6. A film cartridge as recited in claim 1, wherein said forward end portion of the film leader protrudes from said slit to be moved away from the slit as said film leader is moved out outwardly through the slit, said leading end portion of the cover strip is secured to said forward end portion outside said housing, said film-loaded indicator is located on the exterior of said housing, and said intermediate fan-folded portion of the cover strip is located on the exterior of said housing underneath said trailing end portion of the opaque strip to be pulled via said leading end portion from beneath the trailing end portion when said forward end portion is moved away from said slit as said film leader is moved out outwardly through the slit.

7. A film cartridge as recited in claim 6 wherein a transparent open pocket is secured to the exterior of said housing to hold said trailing end portion and said intermediate fan-folded end portion of the cover strip in place on the housing.

8. A film cartridge as recited in claim 1, wherein said filmstrip has a pair of longitudinal edges and a plurality film perforations along at least one of said longitudinal edges, and said cover strip does not cover said film perforations in said film leader to permit the film perforations in the film leader to be engaged for film loading in a camera.

* * * * *

UNITED STATES PATENT AND TRADEMARK OFFICE
CERTIFICATE OF CORRECTION

PATENT NO. : 5,568,219
DATED : October 22, 1996
INVENTOR(S) : Joseph A. Manico, et. al.

It is certified that error appears in the above-indentified patent and that said Letters Patent is hereby corrected as shown below:

Column 5, line 14, delete "and" - insert --end--.

Signed and Sealed this

Eleventh Day of February, 1997

Attest:

BRUCE LEHMAN

Attesting Officer     Commissioner of Patents and Trademarks